No. 652,161. Patented June 19, 1900.
W. BERRY.
CHECKREIN.
(Application filed Apr. 21, 1897.)
(No Model.)
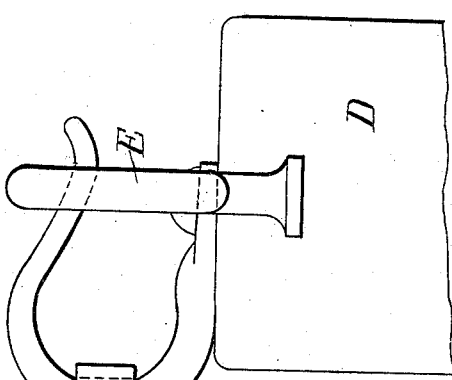
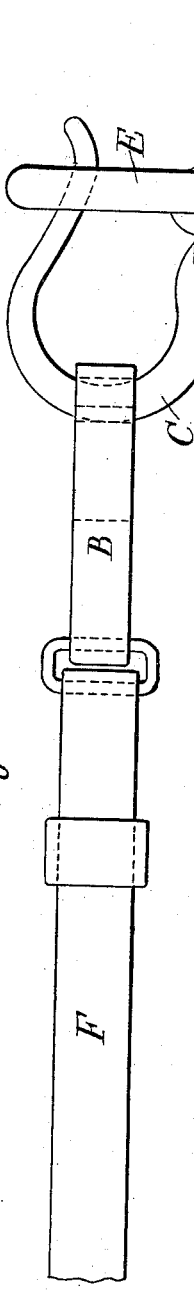
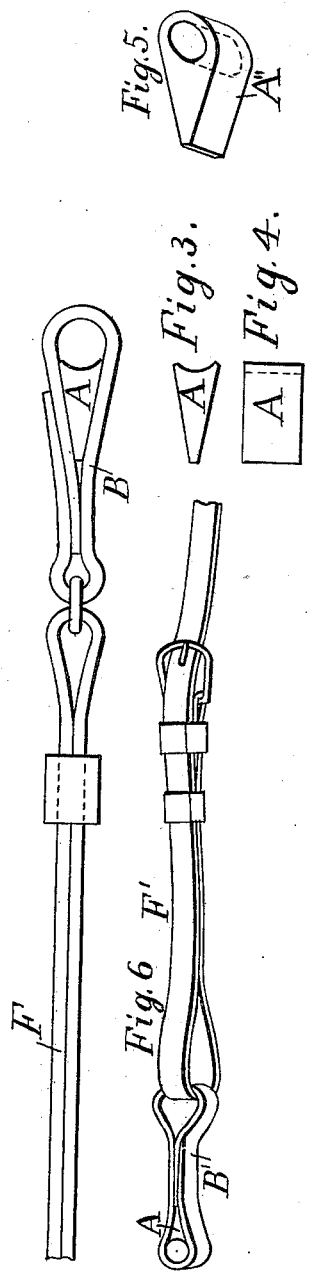
WITNESSES:
Edward M Post
Jno. N. Leonstade
INVENTOR.
William Berry
BY John F. Kerr
ATTORNEY.

UNITED STATES PATENT OFFICE.

WILLIAM BERRY, OF PATERSON, NEW JERSEY, ASSIGNOR OF ONE-HALF TO HENRY V. H. SNYDER, OF SAME PLACE.

CHECKREIN.

SPECIFICATION forming part of Letters Patent No. 652,161, dated June 19, 1900.

Application filed April 21, 1897. Serial No. 633,147. (No model.)

*To all whom it may concern:*

Be it known that I, WILLIAM BERRY, of the city of Paterson, county of Passaic, and State of New Jersey, have invented a new and useful Improvement in Safety Check-Loops, of which the following is a specification.

One object of my invention is to provide a safety-loop for check reins which may be readily adjusted on and removed from the check-hook and which cannot become detached therefrom by the motion or tossing of a horse's head.

A further object is to provide a safety check-loop which will be simple, durable, and cheap.

While my invention relates particularly to a loop for checkreins, the principle may be applied to various other portions of harness and to loops engaged by other hooks.

The invention consists of a leather loop and a rubber plug confined in the loop and arranged to bear on a hook engaged with the loop. The rubber plug may partially or wholly surround the hook which engages the loop.

While one of the objects of my invention is to avoid the use of any metal or any other non-yielding substance in the construction of a loop, the equivalent of the rubber plug may be used in a leather loop without departing from the spirit of the invention.

In the accompanying drawings, which form a part of this specification, Figure 1 represents a portion of a saddle and a hook engaged with my safety-loop. Fig. 2 is a top view of a portion of a check-rein, showing my safety-loop. Figs. 3 and 4 are a top view and side view, respectively, of one form of rubber plug. Fig. 5 is another form of rubber plug; and Fig. 6 is another style of rein, showing my safety-loop.

In my safety-loop I propose to use a rubber plug, such as is shown in Figs. 3 and 5 or any other suitable modification thereof without departing from the character of a plug.

In the drawings, A represents a rubber plug; B, a leather loop; C, a hook, and D a portion of a saddle. The driving-reins pass through the rings E, and F represents one style of a checkrein, and F' represents another style of checkrein.

The rubber plug A is inserted, confined, and secured in any suitable manner in the leather loop which is engaged with the hook. A" in Fig. 5 is a rubber plug to surround the hook.

With this description of my invention, what I claim is—

A checkrein comprising in its construction a strap of a flexible material bent upon itself to form a loop, in combination with a block of rubber fitted and secured in place in the angle of said loop, and partially filling said loop, whereby said loop and yielding block are adapted to embrace the entire circumference of a suitable hook to prevent accidental disengagement therefrom.

WILLIAM BERRY.

Witnesses:
JOHN F. KERR,
WM. M. DREW.